Oct. 1, 1957 A. J. MOORE ET AL 2,807,936
PLURAL MOTOR CONTROL CIRCUIT ADAPTED FOR EVAPORATOR FORMING MACHINE
Original Filed Sept. 16, 1947 4 Sheets-Sheet 1

Inventors
Arthur J. Moore
Marion D. Hopkins
Aage B. Johnson
By The Firm of Charles W. Hills
Attys

United States Patent Office 2,807,936
Patented Oct. 1, 1957

2,807,936

PLURAL MOTOR CONTROL CIRCUIT ADAPTED FOR EVAPORATOR FORMING MACHINE

Arthur J. Moore, Chicago, Marion D. Hopkins, River Forest, and Aage B. Johnson, Chicago, Ill., assignors to Houdaille Industries, Inc., a corporation of Michigan Original application September 16, 1947, Serial No. 774,292, now Patent No. 2,693,842, dated November 9, 1954. Divided and this application January 7, 1954, Serial No. 403,717

4 Claims. (Cl. 60—97)

This invention relates to a machine for shaping articles by bending operations.

Specifically, the invention deals with a machine for accurately bending sheet material, such as sheet metal evaporator blanks, into finished shape without damaging or collapsing embossments or similar preformed portions in the blanks.

The invention will hereinafter be specifically described as embodied in a machine for bending embossed flat sheet metal evaporator blanks into U-shaped evaporator units, but it should be understood that the invention is not limited to such an embodiment, being generally applicable to any machine for accurately bending blanks.

The machine of this invention includes a blank receiving a bed shaped in conformity with embossments on the blank and having a central portion movable between fixed dies at each end thereof. This movable portion is supported on a fluid cushion. A plunger having die portions at the lower corners thereof coacts with the fixed dies and overlies the movable portion of the bed. A flat sheet metal blank placed on the bed projects on either side of the movable portion to overlie the fixed dies. When the plunger is actuated to press on the portion of the blank overlying the movable portion of the bed, the intermediate portion of the blank and the bed is moved downwardly relatively to the fixed dies to effect the bending operation. This bending operation takes place between the stationary die portions of the bed and the die portions of the plunger, and the bending is effected without confining the entire wall of the blank that is being bent relative to the wall portion between the movable bed and the plunger.

Embossments on the blank prevent bowing of the wall portion that is bent during the bending operation, and the movable bed portion holds the central part of the blank in its original flat condition.

A U-shaped unit is formed by the above-described bending operation. In addition, according to this invention, the machine forms flanges at the free ends of the legs of the U-shaped unit. These flanges are created by laterally shiftable dies coacting with the upper corners of the plunger to bend the free ends of the unit over the top of the plunger. When the plunger is retracted, the finished unit is easily stripped by sliding it endwise off the plunger.

The plunger and the laterally shiftable flange-forming dies are actuated by fluid under pressure.

The entire machine is self-contained, including storage tanks for accommodating fluid, and can be quickly reset to accommodate various forms and sizes of workpieces. An automatic timing circuit is provided on the machine so that all parts thereof will operate in properly timed sequence, thereby only necessitating initial starting of the machine whereupon the machine will go through its entire operating cycle.

It is therefore an object of this invention to provide a machine for automatically bending a blank, having preformed embossments or the like, into a predetermined configuration without distorting or deforming the embossments.

Another object of this invention is to provide a machine which performs a multiplicity of consecutive bending operations on a blank by means of a plurality of automatically controlled cylinders mounted on a single support structure.

A further object of this invention is to provide a machine for performing a multiplicity of consecutive bending operations having a die support adapted to permit both lateral and vertical adjustments of the dies thereon without affecting the operation of the die support.

A still further object of this invention is to provide a machine for automatically bending blanks having primary and secondary bending arms in which the length of travel of the secondary bending arms is common for all sizes of blanks.

Another object of this invention is to provide an automatic bending machine that employs a plurality of separately operated valves which act to make reversal of the machine impossible until a complete cycle of operation has been performed.

A still further object of this invention is to provide a die having a portion automatically adjustable for maintaining a pressure on the unsupported portion of the blank during a bending operation.

An important object of this invention is to provide a machine for bending blanks by means of opposed slides wherein the rate of travel of said slides is equalized by means of two hydraulic motors coupled together to form a metering device.

Other and further objects of the invention will be apparent to those skilled in the art from the following detailed description of the annexed sheets of drawings, which, by way of a preferred example, illustrate one embodiment of the invention.

Figures 1, 15, 16:
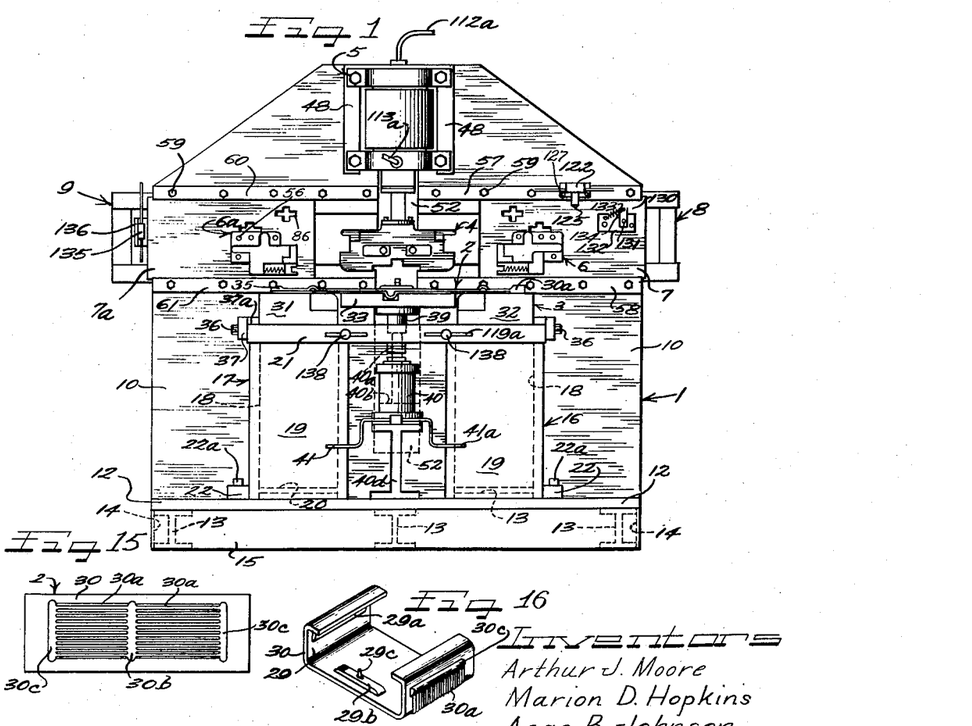
Figure 1 is a front elevational view of the evaporator forming machine of the present invention.
Figure 15 is a plan view of the underside of an evaporator blank to be shaped by the machine of this invention.
Figure 16 is an isometric view of an evaporator unit formed from the blank of Figure 15 by the machine of this invention.
Figure 2:
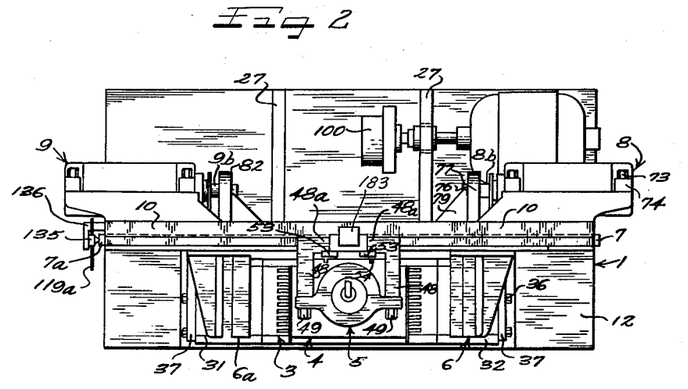
Figure 2 is a plan view of the evaporator forming machine.

In Figures 1 and 2 is shown a support structure 1 having a central vertical panel on which is mounted the working elements of the machine. An evaporator blank 2 which is to be bent into an evaporator unit as illustrated in Figure 16 is positioned on a bedplate 3 that has a central portion movable downwardly between a pair of fixed die members.

Figure 6:
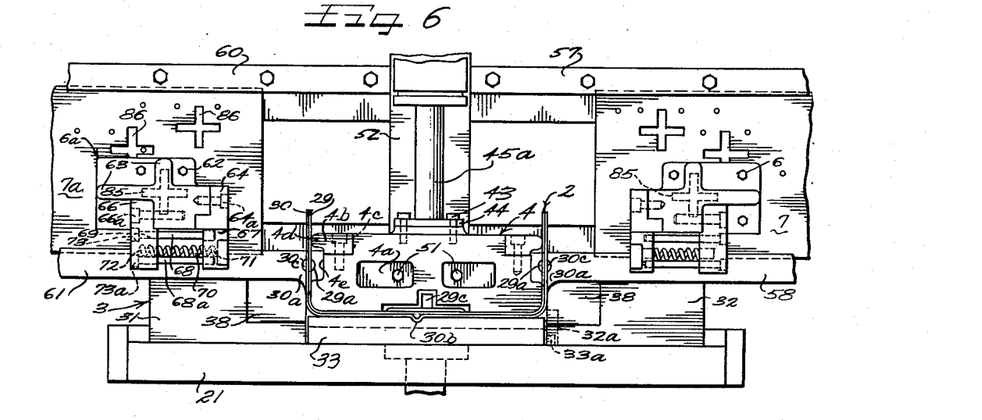
Figure 6 is an enlarged fragmentary front elevational view of the operating portion of the machine showing the parts after the first bending operation has been completed.

A plunger 4 is disposed in alignment with the central yieldable portion of the bedplate 3 depending directly thereabove from the piston rod of a hydraulic piston and cylinder assembly 5 mounted on one face of the vertical mounting panel. The plunger 4 is arranged to move downwardly and press the evaporator blank 2 against the central yieldable portion of the bedplate which then moves downwardly permitting the blank to be bent in a U-shape between the fixed die members, as illustrated in Figure 6.

A pair of oppositely disposed horizontally movable flange forming arms 6 and 6a are mounted on slides 7 and 7a respectively on the same side of the vertical mounting panel as the plunger 4 but are moved with the slides horizontally toward and away from each other by hydraulic piston and cylinder assemblies 8 and 9 respectively which are mounted on the opposite face of the vertical mounting panel. These flange forming arms are arranged to move inwardly toward the U-shaped blank 2, after it has been bent by the plunger 4, and fold the upper ends of the blank over the top of the plunger to form hanger straps, as shown in Figure 16.

In this invention there is also provided an electrical control circuit for co-ordinating the opening of the various valves which direct fluid under pressure to the hydraulic piston and cylinder assemblies.

*The support structure*

As seen in Figure 1 the support structure 1 comprises a vertical structural plate member 10 which is rigidly secured as by welding to a base plate 12 supported on a plurality of I beams 13. A pair of front and rear closure plates 15 are secured to the outer or end I beams 13 underlying the base plate 12. A pair of side plates 14 also underlie the base plate 12 and are overlapped at their ends by the front and rear plates 15. The base plate 12 and the closure plates 14 and 15 are all suitably secured together, as by welding, to form a unitary base structure. As seen in Figure 2, the vertical structural plate 10 extends upwardly from substantially the longitudinal center of the base plate 12.

Disposed on the front side of the plate 10 and supported on the base 12 is a pair of air tanks 16 and 17. Each tank comprises a pair of side walls 18, a pair of front and rear walls 19 and a base 20, all suitably secured together, as by welding, to form an open top tank. A cover plate 21 extends across both tanks 16 and 17 to close the tops of the tanks. Each of the tanks 16 and 17 may be suitably secured to the base plate 12 by means of a flange portion 22 which is secured to the base plate by means of a plurality of cap screws 22a.

Figure 3:
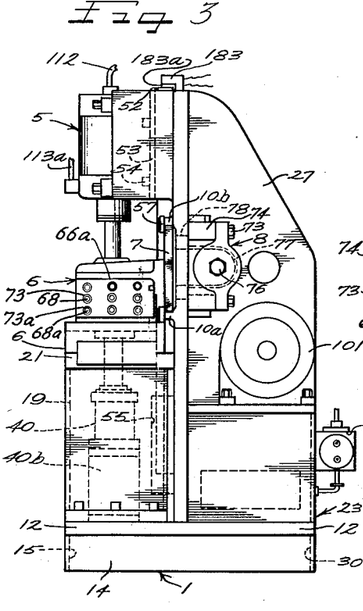
Figure 3 is a side elevational view of the evaporator forming machine shown in Figure 2.
Figure 4:
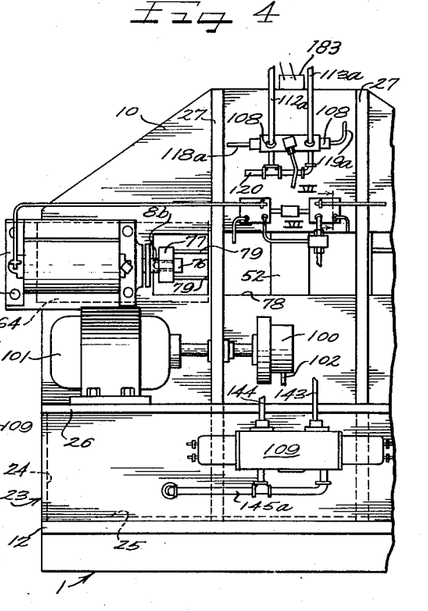
Figure 4 is a fragmentary rear elevational view of the machine.

As best seen in Figures 3 and 4, on the rear side of the vertical structural plate 10, there is disposed an oil tank 23 which is suitably secured to the base plate 12, and to the vertical plate 10. The tank 23 comprises a pair of side plates 24, a base plate 25, and a cover plate 26, all secured together, as by welding, to form a unitary structure using the structural plate 10 as the rear wall of the oil tank.

The structural plate 10 is braced on the base plate 12 by means of two spaced apart rearwardly extending web members 27 which are welded to the base plate 12 and to the back side of the plate 10. The oil tank 23 is fabricated to enclose the lower portions of these web support members 27 and therefore there is provided in each web member an aperture 27a, Figure 3, to afford access from one portion of the oil tank to the other.

*Description of the evaporator blank*

The present invention illustrated in the accompanying drawings, is especially adapted to bend a flanged sheet metal evaporator blank 2 into a substantially U-shaped evaporator unit. This evaporator blank 2, shown in Figures 1, 6, 9 and 15, comprises two sheets of metal 29 and 30 suitably secured together, as by welding or brazing. The inner sheet 29 is a substantially flat member while the outer sheet 30 has a plurality of longitudinal corrugations 30a formed therein. When these sheets are secured together, a series of substantially parallel fluid passages are defined therebetween. Near the center of the outer sheet 30 there is one lateral corrugation 30b, Figures 6 and 15, that crosses and has communication with the longitudinal corrugations 30a. Lateral corrugations 30c are also provided near each end of the outer sheet 30 which communicates with the longitudinal corrugations 30a and, together with similar corrugations 29a in the inner sheet 29, form lateral headers. The inner sheet 29 also is provided near its central section with a longitudinal corrugation 29b which has secured therein a connector 29c.

*Construction of the bedplate*

According to the general features of this invention, the blank 2 is positioned on a work supporting bedplate 3 between two sets of limit blocks 35 and 35a. The bedplate 3 comprises two fixed die block members 31 and 32 suitably secured in place on the cover member 21 of the air tanks 16 and 17. A central yieldable pressure pad 33 disposed between the fixed die members 31 and 32 is held with its lower surface in spaced relation above the cover member 21 and with its upper surface flush with the upper surfaces of the fixed dies 31 and 32.

As shown in Figure 1, each die member 31 and 32 is positioned on the cover member 21. A plurality of set screws 36 pass freely through openings in a retaining block 37 and are threaded into the cover member 21. A spacer block 37a of suitable dimensions is disposed between each die member and the retainer block 37.

Figures 7, 8, 9:
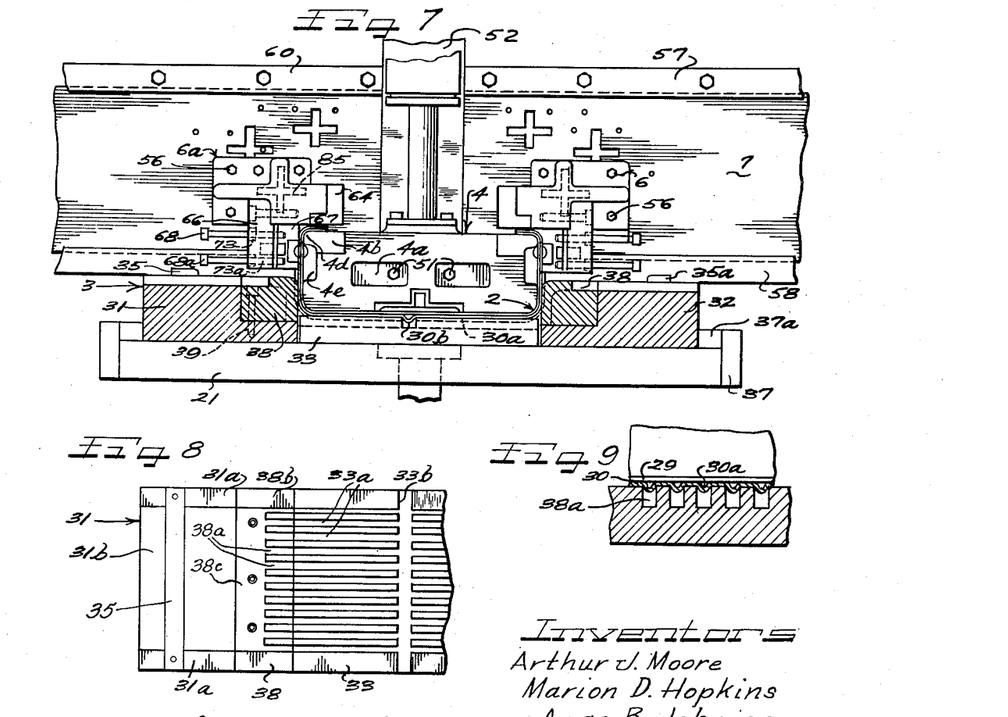
Figure 7 is an enlarged fragmentary front elevational view, partly in section, showing the parts after the second bending operation has been completed.
Figure 8 is a fragmentary plan view of the work supporting bed of the evaporator forming machine of this invention.
Figure 9 is a fragmentary sectional view taken on line IX—IX of Figure 7.

Each of the fixed die members 31 and 32, Figures 7 and 8, have marginal ledge portions or ribs 31a which extend slightly above the central recess portion 31b and between which the blank 2 is positioned. At the inner upper corner of each die member there is provided a die insert 38. This insert is secured to the die member by means of a countersunk cap screw 39.

To aid in positioning the evaporator blank laterally on the bed the insert 38 is provided with a series of grooves 38a which are of a width and depth suitable to receive the corrugations on the outer plate 30 of the blank 2. Marginal ledge portions or ribs 38b are provided on the inserts 38 to correspond to the ledge portions 31a of the member 31. The inserts 38 also each have a recess portion 38c which is flush with the recess portion 31b of the member 31. The grooves 38a also extend downwardly along the inner face of the insert 38 to receive the corrugations of the evaporator blank as it is bent and forced downwardly between the die members.

As is clearly illustrated in Figure 8, the pressure pad 33 is provided with a plurality of grooves 33a which correspond and are in alignment with the grooves 38a of the insert 38 and are adapted to receive the longitudinal corrugations in the outer plate of the evaporator blank. The pressure pad 33 is also provided with a lateral groove 33b adapted to receive the lateral corrugation 30b of the blank.

Thus it is seen that when the evaporator blank is positioned on the bedplate 3 of this forming machine, the corrugations are received in the grooves provided in the fixed die members and the pressure pad. The lateral headers formed at the outer ends of the blank will lie in the recess portions 38c or 31b of the die members 31 and 32.

A fluid cushion is provided for the pressure pad 33 by means of a rod 39, Figure 1, which extends downwardly from the pressure pad 33 and is suitably secured to the outer end of a piston rod 40a projecting from a pneumatic cylinder 40 and attached to a piston 40b slidable in the cylinder. The cylinder 40 is supported on a pedestal 40d and is connected by means of air pipes 41 and 41a to air tanks 16 and 17, respectively. Air is maintained under pressure in the tanks 16 and 17 by a suitable air compressor (not shown) and forms a reservoir for a body of air communicating freely with the underside of the piston 40a in the cylinder to provide an air cushion support for the piston. As the pressure pad 33 is moved downwardly the air in the cylinder 40 is compressed and energy is stored up in the cylinder which will move the pressure pad back to its initial position when the pressure on the pad 33 is removed. As best seen in Figure 6, the top surface of the pressure pad 33 is aligned with the top surfaces of the dies 31 and 32 by means of a projection 33a which rides in a groove 32a of the die 32 and abuts the top of the groove when the surfaces are flush.

Operation of the plunger

The initial bending operation, consisting of forming the work blank 2 into a U-shaped member, as illustrated in Figures 6 and 16, is accomplished by means of a plunger or movable die member 4 which depends directly above the movable pressure pad 33 of the bedplate 3 and is adapted to pass downwardly between the fixed die members 31 and 32. This plunger 4 is suitably secured as by cap screws 43 to a collar 44 at the lower end of a piston rod 45a secured to a piston 45 (Figure 5) in the vertical hydraulic cylinder 5. As best seen in Figure 2, a pair of support arms 48, which are suitably secured as by welding, to the vertical structural plate 10, extend outwardly from the plate to support the cylinder 5 which is fastened thereto by cap screws 49.

As a means of providing rigidity to the plunger structure and to assure accuracy of alignment of the plunger 4 as it moves downwardly, web portions 4a of the plunger 4 are secured by means of cap screws 51 to a slidable vertical guide bar 52. This guide bar is slidably held in alignment near its upper end by opposing surfaces of inwardly projecting arms 48a of the support arm 48 and by vertical retaining straps 53, Figures 2 and 3, which are secured to the arms 48a by cap screws 54. At its lower end the guide bar 52 is slidably held in alignment by a box-like structure 55, Figure 3, which is welded to the frame member 10 and arranged to receive the bar 52 in close fitting sliding relationship in a vertical aperture which has a cross section adapted to receive the bar 52.

In Figure 1 is illustrated the relative position of the blank 2 and the plunger 4 before the bending operation has begun. In Figure 6, the plunger has been moved downwardly forcing the blank 2 and the pressure pad 33 to move downwardly until the pressure pad 33 abuts the horizontal cover plate 21 of the tanks 16 and 17. The blank 2 is, as clearly shown, brought in a U-shape between the plunger 4 and the fixed dies 31 and 32.

Operation of the flange-forming arms

The second bending operation forms hanger flanges on the bent U-shaped workpiece and consists in folding the upper ends of the U-shaped workpiece 2 over the upper corners of the plunger 4 and forcing them into substantially horizontal position along the upper surface of the plunger, as shown in Figure 7. This secondary bending operation is carried out by means of the pair of oppositely disposed flange-forming arms 6 and 6a, which project outwardly from sliding plates 7 and 7a, respectively, being secured thereto by means of a plurality of cap screws 56. The plates 7 and 7a are disposed on either side of the guide bar 52 and are arranged to slide toward and away from said guide bar, each being supported in sliding relation between a pair of arms 10a and 10b, Figure 3, projecting outwardly from the vertical frame member 10. A pair of retaining straps 57 and 58, secured to the arms 10a and 10b by a plurality of cap screws 59, overlaps the sliding plate 7 and holds it in place between the arms 10a and 10b. A similar pair of retaining straps 60 and 61 hold the sliding plate 7a between the arms 10a and 10b.

Sliding movement is imparted to the plate 7 by means of a hydraulic piston and cylinder assembly 8 which is mounted on the rear face of the vertical frame member 10, as shown in Figures 2, 3 and 4. The cylinder assembly 8 is secured by cap screws 73 to a pair of support straps 74 which are welded to the plate 10 and extend outwardly therefrom. The outer end of the piston rod 8b of the piston 8a which projects from the cylinder 8 is secured by means of a cap screw 76 to an arm-like member 77 which is fastened, as by welding, to the rear side of the sliding plate 7 and projects through an opening 78 in the frame member 10. Lateral braces 79 extending between the arm-like member 77 and the plate 10 are provided to support the member 77.

Thus, movement of the piston rod 8b in the hydraulic cylinder 8, mounted on the rear side of the member 10, will cause sliding movement of the plate 7 mounted on the front side of the member 10. Inward movement of the plate 7 may be limited by the effective stroke of the hydraulic cylinder 8 or by the abutting of the sliding plate 7 against the guide bar 52.

The sliding plate 7a, Figure 2, is similarly actuated by a hydraulic cylinder 9 containing a piston 9a which acts through a piston rod 9b and an arm-like member 82 to reciprocate the slide 7a back and forth.

In Figure 6, the relative positions of the workpiece 2 and the slides 7 and 7a are illustrated prior to the beginning of the bending operation. In Figure 7 the slides 7 and 7a have been moved inwardly to fold the upper end of the workpiece 2 down over the top surface of the plunger 4. It is to be noted that the upper corners of the plunger 4 are provided with inserts 4b secured thereto by means of countersunk cap screws 4c. This insert has an outer curved bending edge 4d of suitable curvature providing a convenient means of imparting the necessary bend to the blank at this point. Immediately below the bending edge 4d there is a recess 4e on either side of the plunger 4 for receiving the headers 30e therein.

The flange-forming arms 6 and 6a are similar in construction but are oppositely disposed on their respective sliding plates. Each arm comprises a body portion 62, Figure 6, which has a series of reinforcing ribs 63. A contact block 64, which may be suitably made of bronze, is secured to the inner side of the body 62 by countersunk set screws 64a. A support block 66 is fastened by a cap screw 66a to the outer face of the body 62. As seen in Figures 6 and 7, a pressure pad 67 is supported directly below the contact block 64 by means of a pair of cap screws 68 and 68a each of which has one end tightly threaded into the pad 67 and the other freely journaled in an opening 69 which extends through the lower portion of the support block 66. A spring 70 is disposed between the pad 67 and support block 66 with one end suitably held in a recess 71 of the pad 67 and the other end suitably held in a recess 72 of the block 66.

It is thus seen, in Figure 6, that when the arm 6a is in the withdrawn position the spring 70 pushes the pad forwardly until the heads of the cap screws 68 and 68a are in the sockets 73 and 73a, respectively, countersunk in the support block 66. In this position, the inner face of the pad 67 will be in alignment with the inner face of the contact block 64.

When the arm 6a is moved inwardly the contact block 64 and the pad 67 will contact the workpiece approximately simultaneously. The contact block 64 will continue forwardly as it folds the upper end of the workpiece 2 over the corner of the insert in the plunger 4. The pad 67 contacts the unsupported portion of the workpiece 2 and maintains a pressure thereon as the bending operation is carried out, thus preventing buckling of the workpiece. Since there are lateral headers preformed in the evaporator blank near the outer ends, there is provided in the pressure pad 67 a cutout or recess portion 67a which is arranged to receive the header portion.

It is to be noted that projecting outwardly from the rear face of each of the arms 6 and 6a, there is substantially a cross-shaped projection 85, as shown in dotted lines in Figures 6 and 7. This projection 85 is provided to facilitate aligning and positioning of the arms on the sliding plate which has a mating cross-shaped recess 86 arranged to receive the projection 85. After positioning of the projection 85 in the recess 86 the arm is secured thereon by means of cap screws.

A plurality of recesses 86 and associated tapped holes are provided on the sliding plates 7 and 7a to accommodate the arms in various positions. Thus, in order to alter this machine for using arms that operate at different levels or that have a different effective stroke, it is only necessary to secure the required arm in the correct prelocated recess.

*The control system*

Figures 5, 13, 14:
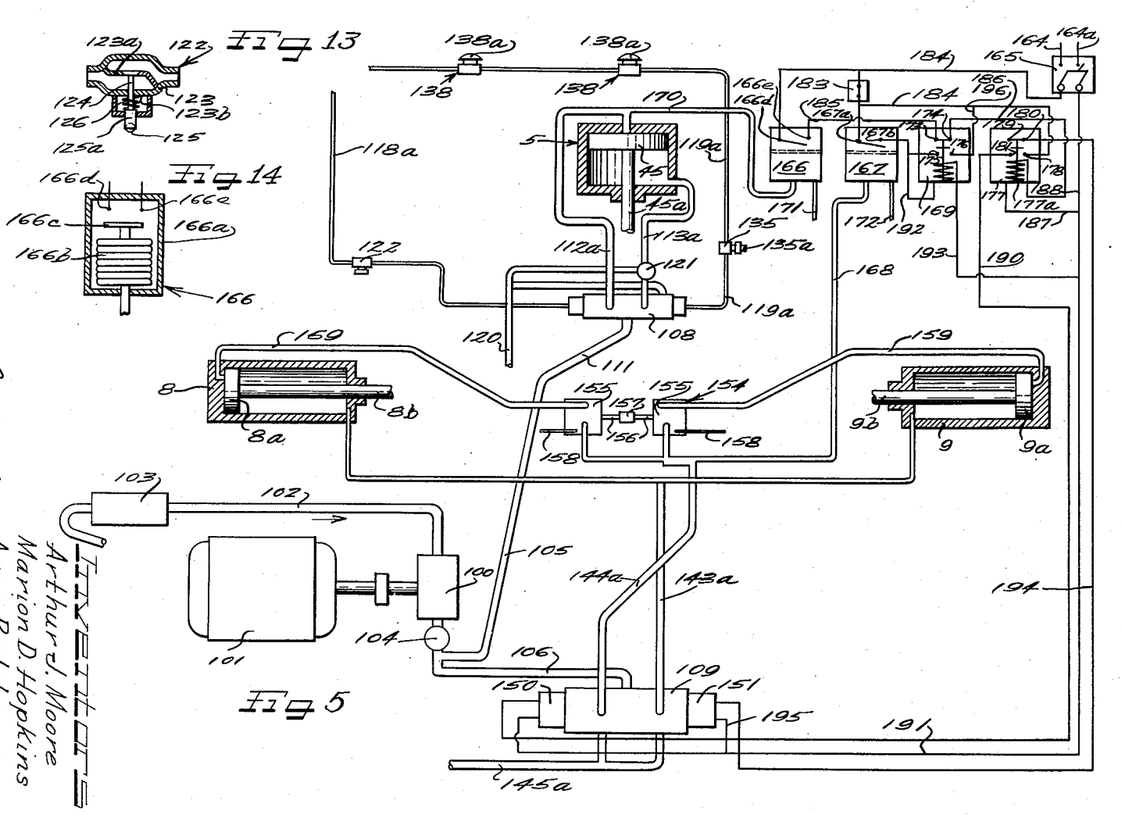
Figure 5 is a schematic drawing of the control circuit used for regulating the operations of the evaporator forming machine.
Figure 13 is an enlarged vertical sectional view through one of the air pilot valves used in the control mechanism of this invention.
Figure 14 is an enlarged fragmentary vertical sectional view through one of the pressure sensitive electrical switches used in the electrical control circuit.

An important feature of this invention is the control system which causes the mechanism to proceed automatically through the bending cycle. Referring to Figure 5, there is shown a schematic drawing of this control cycle. Reference numeral 100 represents a pump secured to the rear side of the structural plate 10, Figure 4, which supplies liquid under pressure to the hydraulic control circuits and which is driven by a motor 101, conveniently mounted on the oil tank 23.

The pump 100 is arranged to draw oil from a fluid line 102 which is connected to the oil tank 23 through a filter 103 positioned therein. Located on the discharge side of the pump 100 is an automatic pressure relief valve 104. The pump 100 discharges into two lines 105 and 106 leading, respectively, to a pair of control valves 108 and 109.

Figure 10:
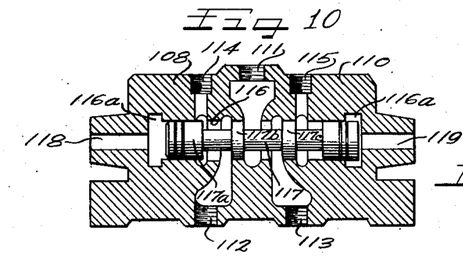
Figure 10 is an enlarged sectional view taken through the center of a pneumatic control valve used in the control apparatus of this invention.

The control valve 108, shown in detail in Figure 10, is suitably mounted on the rear face of the support plate 10 and comprises a casing 110 having an inlet opening 111 and four outlet openings 112, 113, 114 and 115. All of these openings communicate with a cylindrical central chamber 116. A valve member 117 is disposed in the chamber 116 and arranged for longitudinal sliding movement therein. At either end, the chamber 116 has an enlarged cylindrical portion 116a that is segregated from the central chamber by the piston-like end portion 117a on the valve 117, which has a substantially fluid-tight sliding fit in the walls of the chamber. Disposed inwardly along the valve 117 are two spaced apart cylindrical valve members 117b and 117c which also have a substantially fluid-tight sliding fit in the walls of the chamber. At opposite ends of the casing, air inlet passages 118 and 119 are provided for connection to a source of air under pressure.

In operation, the outlet 112 is connected to a line 112a, Figure 5, which leads to the top of the hydraulic cylinder 5 and the outlet 113 is connected to a line 113a which leads to the lower end of the cylinder 5. The outlets 114 and 115 are connected to a common line 120 that discharges into the oil tank 23. A pressure relief valve 121 is disposed in the line 113a and arranged to direct the oil to the line 120 if the pressure in the line 113a becomes excessive.

The air inlet passages 118 and 119 are connected, respectively, to air lines 118a and 119a, both of which lead to the air tank 16, Figure 1. In the line 118a there is arranged a cam actuated pilot valve 122. This valve may suitably comprise, as shown in Figure 13, a casing 123 having an inner cross partition 123a affording a valve seat for receiving the head of a poppet type valve 124. The stem of the valve is connected to a cam roller follower 125 through a cylindrical roller housing 125a in which the roller is pivotally mounted. Upward movement of the cam roller follower 125 causes the valve to move off the seat and permits air under pressure to pass through the valve. A spring 126 is provided in the lower part of the valve casing disposed about the valve stem. At its lower end the spring bears against the upper end of the cam roller housing 125a and at its upper end abuts a cross partition 123b of the casing 123. When the valve is moved upwardly the spring 126 is compressed and positioned to move the valve back onto its seat as soon as the pressure is withdrawn from the cam roller.

The air pilot valve 122 is secured to a slide retaining strap 57, Figure 1, by cap screws 127 with a cam roller 125 projecting downwardly into the path of a cam 130 mounted on the slide 7. The cam 130 is pivotally mounted as at point 131 to a plate 132 secured to the slide 7. A spring 133, anchored at one end on the plate 132 and at the other end on the cam 130, tends to hold the cam 130 against a stop pin 134.

With this construction, the spring 133 will permit the cam 130 to pivot about the point 131 when it comes in contact with the cam roller as the slide 7 is moved inwardly, and thus the valve 122 will not be actuated. However, on the outward stroke of the slide 7, the cam 130 will be held in an upright position against the stop pin 134 by the spring 133 and will therefore be in a position to force the cam roller 125 upwardly to open the valve.

As is shown in Figure 10, when air under pressure enters the inlet 118 of the control valve 108 after passing through the pilot valve 122, the valve member 117 will be moved to the right due to the action of the air on the piston-like end portion 117a of the valve member. With the valve in this position, oil entering the inlet 111 will be directed out through the opening 113 to the line 113a and thence to the bottom of the hydraulic cylinder 5 to lift the piston 45 therein. Any oil in the line 112a will be drained back through the opening 114 and the line 120. Thus the piston 45 is raised by hydraulic pressure through the tripping action of the slide 7 as it moves outwardly after completing its bending operation.

In the air line 119a there is disposed a pilot valve 135 which is similar in its internal construction to the valve 122, illustrated in Figure 13, but differs in that a push button 135a is secured to the valve stem instead of the cam roller 125. This valve is mounted on the left-hand side of the machine, as seen in Figures 1 and 2, by means of a bracket 136 secured to the vertical frame member 10. The push button is so positioned that the slide 7a will depress the button at the end of its outward movement. Thus, the valve 135 will be held open by the slide 7a and it will automatically be closed by spring pressure when the slide moves inwardly. This is a safety feature which prevents air under pressure from being supplied to the control valve 108 for actuating the valve to cause downward movement of the piston in the hydraulic cylinder 5 at any part of the cycle except when the slides are in their outer position.

A pair of pilot valves 138 is also provided in the line 119a. These valves are similar to the pilot valves 122 and 135 except that enlarged push buttons 138a are furnished which are suitable for being actuated by the operator's hand. These valves 138 are mounted across the front of the machine on the face of the cover plate 21 of the air tanks 16 and 17. To start the operating cycle the operator, using both hands, depresses the buttons 138a to permit air under pressure to pass through the valves 138 and through the valve 135, which is held open by the slide 7a, to enter the inlet 119 of the control valve 108, and move the valve member 117 to the left. In this position, oil entering the inlet 111 will be directed out through the opening 112 to the line 112a and thence to the top of the hydraulic cylinder 5 to force the piston 45 therein downwardly to begin the bending operation.

Figure 11:
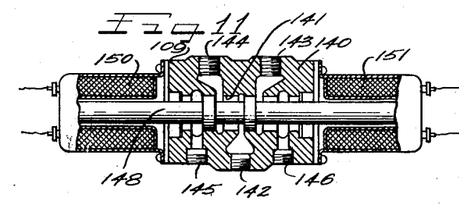
Figure 11 is an enlarged elevational view, partly broken away and partly in section, of a solenoid operated hydraulic control valve used in the evaporator forming machine of the present invention.

The second control valve 109 into which the pump 100 discharges is illustrated in Figure 11 and comprises a casing 140 having a central cylindrical longitudinal chamber 141. An inlet opening 142 and four outlet openings 143, 144, 145 and 146 are provided, each of which communicates with the central chamber 141. A longitudinal member 148, disposed in the chamber 141, has two enlarged cylindrical valve portions 148a and 148b arranged in substantially fluid-tight sliding relation with the walls of the chamber. At either end the member 148 extends into a pair of solenoids 150 and 151, respectively. Thus each end of the member 148 acts as the core of a solenoid. The solenoids 150 and 151 are arranged to be energized separately and alternately, pulling the member 148 either to the left or to the right.

In operation the inlet 142 is connected to the supply line 106 leading from the pump. The outlet 143 is connected to a line 143a which has two branches, one leading to the inner end of each hydraulic cylinder 8 and 9. The outlets 145 and 146 are connected to a common line 145a which leads to the oil tank 23. The outlet 144 is connected to a line 144a leading to a hydraulic metering device 154.

When the member 148 of the valve 109 is moved to the left, as illustrated in Figure 11, oil entering through the opening 142 will be directed out through the opening 144 to the line 144a leading to the hydraulic metering device 154. When the solenoid 151 is energized the member 148 will be drawn to the right and communication will be established between the inlet port 142 and the outlet 143 for directing liquid through the line 143a to the inner ends of the hydraulic cylinders 8 and 9.

The hydraulic metering device 154 may suitably comprise two identical rotary pumps 155 having shaft members 156 coupled together by a connector or coupling 157. These pumps are arranged to be operated as a hydraulic motor by the fluid entering from the line 144a. Since the shafts of the motor are coupled together both motors will rotate at the same speed and the quantity and pressure of fluid discharged will be equalized and will be delivered through lines 159 to the outer end of the hydraulic cylinders 8 and 9.

Figure 12:
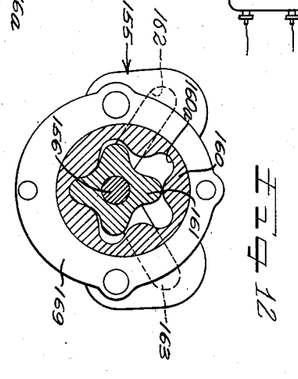
Figure 12 is an enlarged sectional end view taken on line XII—XII of Figure 4 showing the hydraulic motor which is used as a metering device.

In Figure 12 is shown an end view of a rotary pump suitable for use as a metering device. This pump comprises a casing 169 having a central opening in which a ring gear 160 having internal teeth 160a is journaled for rotation. A cooperating pinion gear 161 with external teeth 161a is eccentrically mounted inside the ring gear 160. The pinion gear is secured to the drive shaft 156 and arranged to rotate in a counterclockwise direction as seen in Figure 12. An inlet port 163 is furnished at one side of the casing and an outlet port 162 is provided on the opposite side of the casing. The teeth are so designed that the tooth spaces of the meshing gears form a series of gradually expanding closed chambers during a part of the revolution and a series of gradually contracting closed chambers during another part of the revolution; and the ports are so arranged that, when the unit is operated as a pump, the expanding chambers serve to suck fluid from the inlet port 163 and the contracting chambers serve to expel fluid through the outlet port 162. When the unit is operated as a hydraulic motor, the fluid entering the inlet 163 will cause counterclockwise rotation of the gears and of the shaft 156.

A bleed line 158, Figure 5, is provided for each hydraulic motor to direct any excess fluid in the motor to the oil tank 23.

The solenoid control valve 109 is controlled by means of an electrical circuit which in turn is responsive to the pressures existing in the hydraulic line heading to the hydraulic cylinders. This electrical control circuit comprises a switch 165 for closing the circuit at the source of power, and an automatic switch 166 which is responsive to the hydraulic pressure in a line 170 which is a continuation of the pressure line 112a leadinng to the top of the piston 45 in the hydraulic cylinder 5. This switch 166 may suitably comprise, as illustrated in Figure 14, a casing 166a in which is mounted a flexible diaphragm 166b. Secured to the top of the diaphragm 166b is a contact member 166c adapted to be moved upwardly to close a circuit between the two electrical conductors, 166d and 166e, disposed therein. It is to be understood that liquid under pressure acts on the underside of the diaphragm and that the diaphragm is so designed as to resist upward expanding movement thereof until the desired pressure of the hydraulic line 170 has been reached. This pressure in the hydraulic line will be reached when the piston 45 reaches the bottom of its downward travel since the pump 100 will continue to pump liquid into the line 112a and thus build up further pressure in the line 170. Thus the pressure switch 166 is arranged to be actuated to close the electrical switch therein after the piston 45 has reached the bottom of its stroke.

A second pressure actuated switch 167 is similarly constructed to the switch 166 and is responsive to hydraulic pressure in the line 168 which leads from the supply line 144a. Pressure will be built up in the line 168 after the pistons 8a and 9a of the horizontally disposed hydraulic cylinders 8 and 9, respectively, have been moved inwardly to the end of their stroke. Further introduction of liquid into the line 144a will cause the building up of pressure in the line 168 and actuation of the switch 167. A pair of bleed lines 171 and 172 are provided for the switches 166 and 167 to bleed excess liquid to the oil tank 23.

A solenoid switch 169 is provided in the electrical control circuit which is equipped with a plunger arranged to close a circuit between a pair of contact lines 173 and 174 when the solenoid 169a is deenergized and to close another circuit between the contact points 175 and 176 when the solenoid is energized.

A second solenoid switch 177 is provided which has an armature adapted to close a circuit between the electrical contact points 178, 179 and 180 when the solenoid is deenergized and to close a circuit between the points 178 and 181, when the solenoid is energized.

For the purpose of deenergizing the electrical control circuit at the end of the bending operation there is provided a limit switch 183 which is disposed, as shown at Figure 3, at the top of the vertical structural member 10, with a plunger 183a depending downwardly into the path of the vertically moving guide bar 52, which is disposed centrally on the front side of the structural member 10. When the bending operation is completed and the plunger 4 is drawn upwardly by the piston 45, the guide bar 52 will slide upwardly and at its extreme upper position will contact the plunger 183a to open the connection and thus deenergize the circuit.

It is to be understood, of course, that when the next bending cycle is begun and the plunger 4 is moved downwardly by the initial application of hydraulic pressure to the top of the piston 45, the guide bar 52 will also move downwardly and the circuit will automatically close by spring pressure being exerted on the plunger 183a.

The bending operation

The complete bending operation performed on the evaporator by the machine of this invention is performed in the following manner. An evaporator blank 2 is placed on the bedplate 3 with the corrugations or embossments properly positioned in the grooves provided in the die members 31 and 32 and in the pressure pad 33. Then, assuming that the sliding plates 7 and 7a are in their outer position, and that the pump 100 has built up the necessary pressure in the hydraulic line and that there is sufficient pressure in the air chambers, the operator compresses the buttons 138a to permit air under pressure to pass through the valves 138 in the line 119a and through valve 135 which is held in open position by the slide 7a. This air will actuate the valve member in the control valve 108 and move it to the left to permit oil under pressure entering the valve from the line 105 to pass through the valve and be discharged through the outlet 112 into the line 112a which leads to the top of the piston 45. The piston 45 will thus be moved downwardly to begin the downward stroke of the plunger 4. The plunger proceeds downwardly and contacts the work piece 2 bending it between the fixed dies 31 and 32. Downward movement of the plunger will be arrested when the pressure pad 33 contacts the cover member 21, at which point the hydraulic pressure in the line above the piston 45 and in line 170 will begin to build up and, at a predetermined pressure, will cause the pressure actuated switch 166 to close the circuit at the contact points 166d and 166e in the switch. A circuit is thus established between the power supply conductor 164, the closed switch 165, the conductor 184, the switch 166, the conductor 185, contact points 173 and 174 in the switch 169, conductor 186, the solenoid 177a in the solenoid switch 177, a conductor 187 and the conductor 188, back to the power supply conductor 164a. Thus, the solenoid 177a will be energized to pull the armature down and close a circuit between the points 181 and 178 in the switch 177. This will cause a second current to flow between the power supply conductor 164, the conductor 184, the closed switch 183, a conductor 189, the contact points 178 and 181 in the solenoid switch 177, a conductor 190, the solenoid 150 in the solenoid control valve 109, a conductor 191, and the conductor 188 back to the power supply conductor 164a. Energization of the solenoid 150 causes the valve member 148 to be drawn to the left, as shown in Figure 11, permitting oil under pressure in the line 106 to pass through the inlet 142 to the outlet 144 and then through the line 144a to the hydraulic metering device 154. The liquid leaving the hydraulic metering device moves the pistons 8a and 9a inwardly to cause the slides 7 and 7a to be moved inwardly and thus the flange forming arms 6 and 6a extending from the slides will be moved inwardly to complete the bending operation.

When the slides 7 and 7a have moved inwardly to the end of the stroke, pressure will be built up in the line 144a and the line 168 which lead to the pressure switch 167. When sufficient pressure is built up in the switch, the switch 167 will be closed across the contact points 167a and 167b. A circuit will thus be established between the supply conductor 164, the conductor 184, the switch 183, the switch 167, the conductor 192, the solenoid 169a of the solenoid valve 169, a conductor 193, and the conductor 188 back to the power supply conductor 164a. Thus, the solenoid 169a is energized and causes the armature to move downwardly establishing contact between the points 175 and 176 and breaking contact between the points 173 and 174 within the switch. The breaking of the contacts between the points 173 and 174 will cause the deenergization of the solenoid 177a. The armature of this solenoid will therefore move upwardly under spring pressure to break the contact between the points 178 and 181 and establish contact between the points 178 and 179 and 180 within the switch 177. Breaking of the contact between the points 178 and 181 in the switch 177 causes the deenergization of the solenoid 150 in the control valve 109.

However, the energization of the solenoid 169a causes a contact to be made between the points 175 and 176 and establishes a circuit between the power supply conductor 164, the conductor 184, the switch 183, the conductor 189, the contact points 178, 179 and 180 in the switch 177, a conductor 194, the solenoid 151, a conductor 195, a conductor 191 and the conductor 188 back to the power supply conductor 164a.

It is to be noted at this point that when the armature of the solenoid 169a is moved downwardly by the energization of the solenoid, it makes a holding circuit between the power supply conductor 164, the conductor 184, the switch 183, the conductor 189, a conductor 196, the contact points 176 and 175 in the switch 169, a conductor 192, the solenoid 169a, the conductor 193, the conductor 188 back to the power supply conductor 164a. Thus, there is established a holding circuit which will keep the solenoid 169a energized even through pressure in the switch 167 should drop off and allow the contact across the points 167a and 167b to be opened.

When the solenoid 151 is energized the valve member 148 will be drawn to the right permitting oil under pressure entering through the inlet 142 to pass out the opening 143 into the line 143a which leads to the inner side of the pistons 8a and 9a in the hydraulic cylinders 8 and 9, respectively, causing these pistons to be moved outwardly and return the slides 7 and 7a to their outer positions. Movement of the valve member 148 to the right also permits oil under pressure in the line 144 to be drained out the outlet 145 back to the oil tank 23.

When the slides 7 and 7a move outwardly, the slide 7 will trip the pilot valve 122 and permit air under pressure to be introduced into the inlet 118 of the control valve 108 and cause the valve member 117 to be moved to the right. This will permit oil to be drained back through the opening 112 and the outlet 114 to the oil tank 23 and will permit oil under pressure entering at the inlet 111 to be directed to the outlet 113 and thence through the line 113a to the lower side of the piston 45 to move the piston upwardly.

When the piston moves upwardly the guide bar 52 secured to the plunger 4 will also move upwardly and open the switch 183 located on the top of the frame member 10 and thus deenergize the electrical circuit.

With the plunger 4 in the upper position, the blank 2, which has now been bent into an evaporator unit, may be stripped from the plunger by sliding it toward the operator.

Thus it is seen that there is provided in this invention a bending machine having a work receiving bed adapted to hold a work sheet having preformed embossments in such a way that the embossments will not be deformed during the bending operation. This machine also makes use of two separated valves both of which must be depressed by the operator's hands before the machine will cycle after loading and incorporates a control circuit which makes it necessary for the machine to complete its cycle before it can begin a second cycle. This not only protects the operator but renders it impossible to reverse movement of the cylinders after starting until a complete cycle of operation is performed thus protecting both the blank and the machine from accidental or intentional damage through irregular sequence of pressure movements. The machine is arranged to perform its complete sequence of operation and automatically stops for unloading or removal of finished work and the introduction of a new unformed blank and may not be started again except by depression of the two separate hand operated control valves 138.

There is also provided in this invention a bending machine in which it is necessary, for changes in size of an evaporator blank, only to replace the punch, the arms and the pressure pad, the length of travel of the bending being common to all sizes of blanks.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In a bending machine having a first plunger and a pair of second plungers laterally movable with respect to said first plunger, a fluid pressure supply means for supplying hydraulic fluid under pressure, first and second actuating fluid lines leading to opposite sides of said first plunger to actuate said first plunger in respective opposite directions, third and fourth actuating fluid lines leading to respective opposite sides of said pair of second plungers to actuate said second plungers in respective opposite directions, control means comprising a pneumatically operated valve connected between said fluid pressure supply means and said first and second actuating fluid lines to selectively control supply of fluid pressure to the respective opposite sides of said first plunger, a solenoid operated valve connected between said fluid pressure supply means and said third and fourth actuating fluid lines to selectively control supply of fluid pressure to the respective opposite sides of said second plungers, an electrical switch sensitive to hydraulic pressure in said first fluid line to said first plunger for energizing said solenoid operated valve to direct fluid to said third fluid line leading to said second plungers, an electric switch sensitive to hydraulic pressure in said third fluid line for energizing said solenoid operated valve to direct fluid to said fourth fluid line leading to said second plungers for returning said second plungers to their initial position, and a pneumatic valve actuated by one of said second plungers on its return stroke to actuate said pneumatically operated valve to direct fluid to said second fluid line leading to said first plunger for returning said first plunger to its original position.

2. In a bending machine having a first plunger and a pair of second plungers laterally movable with respect to said first plunger, a fluid pressure supply means for supplying hydraulic fluid under pressure, first and second actuating fluid lines leading to opposite sides of said first plunger to actuate sad first plunger in respective opposite directions, third and fourth actuating fluid lines leading to respective opposite sides of said pair of second plungers to actuate said second plungers in respective opposite directions, control means comprising a pneumatically operated valve connected between said fluid pressure supply means and said first and second actuating fluid lines to selectively control supply of fluid pressure to the respective opposite sides of said first plunger, a solenoid operated valve connected between said fluid pressure supply means and said third and fourth actuating fluid lines to selectively control supply of fluid pressure to the respective opposite sides of said second plungers, an electrical switch sensitive to hydraulic pressure in said first fluid line to said first plunger for energizing said solenoid operated valve to direct fluid to said third fluid line leading to said a second plungers, an electric switch sensitive to hydraulic pressure in said third fluid line for energizing said solenoid operated valve to direct fluid to said fourth fluid line leading to said second plungers for returning said second plungers to their initial position, first and second pneumatic actuating lines connected to said pneumatically operated valve to shift said valve between a position for delivering hydraulic fluid to one side of said first plunger and a position for delivering hydraulic fluid to the other side of said first plunger, a first pneumatic valve controlling said first pneumatic line and actuated by one of said second plungers on its return stroke to actuate said pneumatically operated valve to direct fluid to said second fluid line leading to said first plunger for returning said first plunger to its original position, and a second pneumatic valve in said second pneumatic line to said pneumatically operated valve and held open by one of said second plungers in its initial position and permitted to close when said second plunger moves away from its initial position.

3. In a bending machine having a first plunger and a pair of second plungers laterally movable with respect to said first plunger, a fluid pressure supply means for supplying hydraulic fluid under pressure, first and second actuating fluid lines leading to opposite sides of said first plunger to actuate said first plunger in respective opposite directions, third and fourth actuating fluid lines leading to respective opposite sides of said pair of second plungers to actuate said second plungers in respective opposite directions, control means comprising a pneumatically operated valve connected between said fluid pressure supply means and said first and second actuating fluid lines to selectively control supply of fluid pressure to the respective opposite sides of said first plunger, a solenoid operated valve connected between said fluid pressure supply means and said third and fourth actuating fluid lines to selectively control supply of fluid pressure to the respective opposite sides of said second plungers, an electrical switch sensitive to hydraulic pressure in said first fluid line to said first plunger for energizing said solenoid operated valve to direct fluid to said third fluid line leading to said second plungers, an electric switch sensitive to hydraulic pressure in said third fluid line for energizing said solenoid operated valve to direct fluid to said fourth fluid line leading to said second plungers for returning said second plungers to their initial position, a pneumatic valve actuated by one of said second plungers on its return stroke to actuate said pneumatically operated valve to direct fluid to the second line leading to said first plunger for returning said first plunger to its initial position, and a pair of hydraulic motors coupled together in one of said third and fourth fluid lines between said solenoid operated valve and said second plungers for metering the fluid flow in said one of said third and fourth fluid lines.

4. In a bending machine having a first plunger and a pair of second plungers laterally movable with respect to said first plunger, a fluid pressure supply means for supplying hydraulic fluid under pressure, first and second actuating fluid lines leading to opposite sides of said first plunger to actuate said first plunger in respective opposite directions, third and fourth actuating fluid lines leading to respective opposite sides of said pair of second plungers to actuate said second plungers in respective opposite directions, control means comprising a pneumatically operated valve connected between said fluid pressure supply means and said first and second actuating fluid lines to selectively control supply of fluid pressure to the respective opposite sides of said first plunger, a solenoid operated valve connected between said fluid pressure supply means and said thrd and fourth actuating fluid lines to selectively control supply of fluid pressure to the respective opposite sides of said second plungers, an electrical switch sensitive to hydraulic pressure in said first fluid line to said first plunger for energizing said solenoid operated valve to direct fluid to said third fluid line leading to said second plungers, an electric switch sensitive to hydraulic pressure in said third fluid line for energizing said solenoid operated valve to direct fluid to said fourth fluid line leading to said second plungers for returning said second plungers to their initial position, a pneumatic valve actuated by one of said second plungers on its return stroke to direct fluid to said second line leading to said first plunger for returning said first plunger to its original position, and a switch disposed to be opened by said first plunger as it returns to its initial position for de-energizing the electrical circuit to said electrical switches.

References Cited in the file of this patent

UNITED STATES PATENTS

| | | |
|---|---|---|
| 931,426 | Loudon | Nov. 30, 1909 |
| 2,054,296 | Merrill | Sept. 15, 1936 |
| 2,084,149 | Larsen | June 15, 1937 |
| 2,227,265 | Lauterbach | Dec. 31, 1940 |
| 2,229,862 | Menges | Jan. 28, 1941 |
| 2,302,115 | Gazey | Nov. 17, 1942 |
| 2,307,544 | Robinson | Jan. 5, 1943 |
| 2,403,391 | Muir | July 2, 1946 |
| 2,693,842 | Moore et al. | Nov. 9, 1954 |